United States Patent [19]
Holloway

[11] 3,806,943
[45] Apr. 23, 1974

[54] ANECHOIC CHAMBER

[76] Inventor: Albert L. Holloway, 936 E. Meadow Ln., Palo Alto, Calif. 94303

[22] Filed: Oct. 2, 1972

[21] Appl. No.: 294,176

[52] U.S. Cl. ............................... 343/703, 343/18 A
[51] Int. Cl. ............................................ H01q 17/00
[58] Field of Search ........................... 343/18 A, 703

[56] References Cited
UNITED STATES PATENTS

| 2,988,740 | 6/1961 | Albanese | 343/703 |
| 3,631,503 | 12/1971 | Tang et al. | 343/754 |
| 3,029,430 | 4/1962 | Jones | 343/703 |
| 3,290,598 | 12/1966 | Thomas | 343/18 A |
| 3,308,463 | 3/1967 | Emerson | 343/18 A |

Primary Examiner—Eli Lieberman
Attorney, Agent, or Firm—Limbach, Limbach & Sutton

[57] ABSTRACT

A portable microwave anechoic chamber having uniform response characteristics for rotated linearly polarized test sources, the chamber, having a first conical section at the apex of which is mounted the emission test source and a second cylindrical portion communicating with the conical portion in which is mounted the tested device.

7 Claims, 3 Drawing Figures

PATENTED APR 23 1974 3,806,943

ANECHOIC CHAMBER

BACKGROUND OF THE INVENTION

This invention relates to anechoic chambers, particularly for testing radar and microwave devices by simulating a space environment in which there are no reflections and external noise to interfer with an accurate evaluation of tested devices.

Anechoic chambers suitable for radar and microwave testing generally comprise elongated chambers having inner walls lined with an absorbant material. While some chambers are small in dimension, the chambers are often room sized and therefore become fixtures at a test facility. To conserve on space and particularly on the requirement for expensive absorbant liner material, the end of the chamber adjacent the test source or emitter can be convergent to correspond generally to the divergent pattern of source emissions. Since the customary configuration of the test end of anechoic chambers is rectangular, the convergent end is most conveniently pyramidal.

However, it has been discovered by this inventor that in testing certain extremely sensitive antenna devices with a linearly polarized emission source, uniform patterns were not always obtainable when the emission source was rotated with respect to the antenna device. A linearly polarized emission source is used to generate an emission field of distinct orientation which is employed to test the response uniformity of an antenna in all angular polarizations by rotating the source on an axis defined by the source and antenna.

While in certain instances the antenna was responsible for response irregularities, in other instances the irregularities could only be attributable to the chamber. It was theorized that the rectangular cross section in the test area of the conventional chamber was responsible for creating irregular reflection patterns which in ordinary testing were insignificant, but in linearly polarized phase testing became apparent.

SUMMARY OF INVENTION

The invented anechoic chamber eliminates both the fixture characteristic and, in linearly polarized phase testing, the irregular response or reflection characteristic of conventional anechoic chambers by providing a chamber that is portable and is cylindrical-conical in construction.

Generally in designing an anechoic chamber it has been the rule to avoid curved surfaces. It was considered that curved surfaces reflected radar or microwave signals in a focal manner, and thus presented the opportunity of effectively amplifying extraneous noise at a particular point, which randomly might be the point at which tests were conducted. Curved surfaces have thus been summarily discarded in design of the testing area of an anechoic chamber.

Contrary to accepted practice, the invented anechoic chamber uses a cylindrical chamber coupled to a conical chamber to provide a chamber that is uniform in longitudinal cross section for the full cycle of a rotating linearly polarized emission source. The focusing effect of the curved chamber walls is found to be negligible even for a centrally located test device and is fully offset by the obtained uniformity in linearly polarized phase testing.

Additionally, exceptional performance has been obtained with a cylindrical-conical chamber of substantially smaller size than conventional chambers of similar general performance characteristics. Coupled with the inherent strength advantages of cylindrical configurations the reduced size and weight enables the invented chamber to be portable, riding on a plurality of wheels or casters.

DETAILED DESCRIPTION OF THE PREFERRED EMBODIMENT

Figure 1:
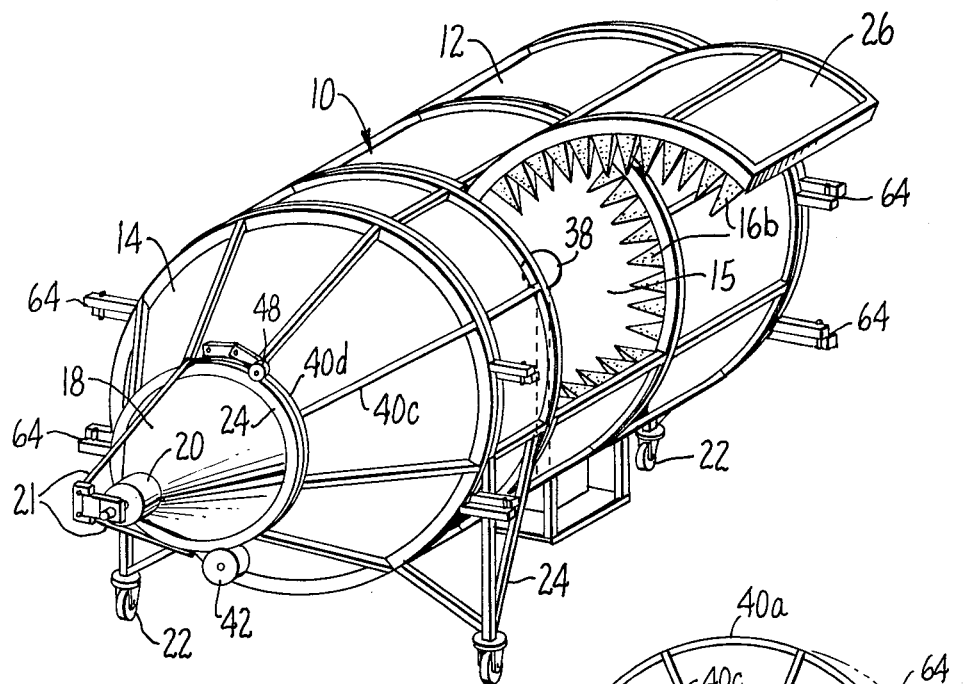
FIG. 1 is a perspective view of the cylindrical-conical anechoic chamber.

Referring to the perspective view of FIG. 1, the anechoic chamber 10 shown therein comprises a cylindrical portion 12 coupled to and integral with a conical portion 14 on a common axis forming a continuous enclosed inner chamber 15 lined with an absorbant material 16. At the end of the conical portion is a microwave emitter horn 18 having a polarized emission source 20 mounted in the apex of the horn 18 and supported with respect to the chamber by support rods 21.

The horn 18 is removeable and replaceable to permit horns of different emission band width to be used in wide or select frequency spectrum testing.

The anechoic chamber 10 shown is FIG. 1 is portable and supported on three casters 22, to provide a three point support for operational stability. The casters are carried by structural leg members 24, two of the casters being arranged adjacent the conical portion and one arranged at the end of the cylindrical portion of the chamber.

On the side of the chamber is provided an access door 26 which is raisable to permit convenient access to the inside of the chamber adjacent the test area in the cylindrical portion.

Figure 3:
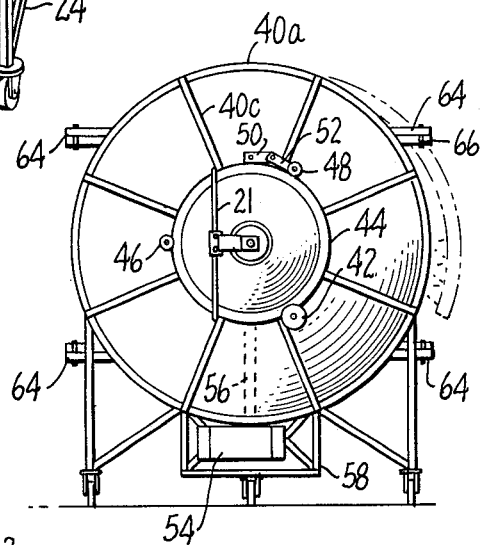
FIG. 3 is an end elevational view of the chamber of FIG. 1.
Figure 2:
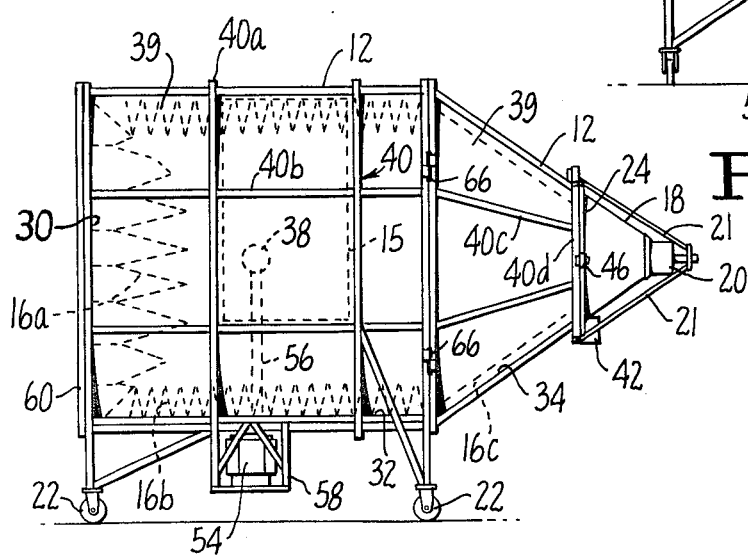
FIG. 2 is a side elevational view of the chamber of FIG. 1.

With reference to FIGS. 2 and 3, the continuous inner chamber 15 formed by the cylindrical and conical portions is lined with microwave absorbant materials, shown in phantom, which comprise large elongated pyramids 16a at the end wall 30, smaller pyramids 16b at the cylinder wall 32, and a uniform layer 16c at the conical wall 34.

The large pyramids 16a at the end wall absorb the brunt of the source emissions directed at an antenna or other tested device 36 mounted on a pedestal 38 in the cross sectional center of the test area in the cylindrical portion of the chamber as shown in FIG. 2. The smaller pyramids 16b at the side wall, substantially eliminate the fringe of the emission pattern and reflected waves in the cylindrical portion of the chamber. The layer 16c of the conical wall does not absorb direct emissions, since the divergent conical portion of the chamber is designed to lie in the shadow of the radiant source emissions, but does absorb what little emitted energy that is reflected back into the conical portion of the chamber and additionally provides an insulation layer from interference noise external to the chamber.

The absorbant materials are attached to the smooth inner walls, 30, 32, and 34, of the chamber with an epoxy or rubber base cement. The walls are formed by sheet aluminum 39 shaped and supported by a plurality of external steel ribs 40. Alternately, both the wall and ribs may be formed of a plastic or other structural material more suitable for mass production. The ribs 40 as exemplified in the drawings comprise circumferential ribs 40a which encircle the chamber, longitudinal ribs 40b uniformly spaced around the circumference of the cylindrical portion of the chamber, convergent ribs 40c uniformly spaced around the conical portion of the chamber, and a circular nose rib 40d mounted at the end of the chamber and against which the microwave emitter horn 18 is mounted.

The horn 18 is rotatable on its central axis by a small variable speed drive motor 42 attached to the conical portion 14 of the chamber. The horn has a peripheral flange 44 which is retained by two flanged guide rollers, 45 and 48, and by the drive motor 42 which rotates the horn by a frictional drive roller (not shown). One of the guide rollers 48 is linked to a fixed mount 50 by an arm 52, which is manually raised to permit the horn 18 to be mounted against the circular nose rib 40d at the end of the conical portion of the chamber.

The conical portion of the chamber is so constructed and arranged that a standard "shelf item" horn can be used with only the addition of the flange 44. However, where a horn is specifically designed to be adapted to a chamber of the type disclosed, it can be substantially smaller for ease of replacement. If such a horn is adapted, the construction of the conical portion of the chamber should, of course, be extended and approach an apex to geometrically accomodate a horn of smaller dimensions.

Microwave emissions from the emission source 20 within the horn 18 are directed at an antenna or other tested device 36 positioned on the pedestal 38 at the center of the test area, or test center, in the cylindrical portion of the chamber. The position of the pedestal and hence the antenna can be variably controlled by a servo drive 54 connected to the pedestal by a column 56 mounted in a cradle structure 58 suspended below the chamber. The servo drive can variously rotate the pedestal, raise or lower it or provide other remote controlled movement to the pedestal by appropriate conventional design as necessary to accomplish desire test procedures.

In addition to the side access door 26, which provides convenient access to the pedestal 38 and the general test area, a rear access door 60 is provided, which permits the entire end wall 30 of the cylindrical portion of the chamber to be opened on pivot hinges 64. Access to the emission source end can also be provided by identical hinges 64 and pins 66 which permit the entire conical portion 14 to be opened. Hinges can be provided on both sides of the conical portion to permit opening from either side by removal of the appropriate pins. This feature can also be included for the end wall access.

Since the diameter of the preferred embodiment is only slightly over 5 feet and the overall height is under 6 1/2 feet, the chamber can be easily moved from one location to another and does not comprise a fixture which must be disassembled to be moved.

While the above disclosure describes the preferred embodiment of my invention, it will be apparent that the inventive concept of providing a test area having uniform longitudinal cross sections taken on a test line defined by the emission source and the test center, can be accomplished by other geometric configurations.

While a cylinder and a cone, either coupled together or used alone as a test chamber, provide ideal uniformity in longitudinal cross section, the circular transverse cross section of these configurations can be approached by chamber configurations having transverse cross sections with a substantial plurality of sides, such as a configuration with a regular octagonal cross section. Performance, however, will improve as the number of sides increases until the cross section is substantially circular.

In this manner a centrally positioned polarized emission source directed down the axis of the chamber will have the same "view" of the chamber regardless of its angular orientation about the axis. When the test line to the test center coincides with the chamber axis a tested device positioned at the test will more accurately respond to the orientation phases of a rotated linearly polarized emission source without introduction of response signals that would be attributable to the otherwise irregular configuration of a chamber.

I claim:

1. An anechoic test chamber for testing antenna devices in the chamber comprising:
    a conical section,
    a cylindrical section having a transverse end wall and an open end coupled to the conical section, the conical section and cylindrical section forming a substantially continuous enclosed chamber having a common central axis, the two sections having inner walls lined with a microwave absorbent material,
    support means for supporting a microwave emission source substantially at the apex of the conical section of the chamber,
    an antenna support structure adapted to support an antenna device to be tested in the cylindrical section substantially on the common central axis,
    a linearly polarized microwave emission source connected to said support means and directed along said common central axis, and
    drive means operably connected to said emission source for rotating said emission source about said axis for testing in all angular polarizations the response of an antenna device supported on said antenna support structure in the chamber.

2. The anechoic test chamber of claim 1 wherein the walls of the cylindrical section including the transverse end wall are lined with pyramidal shaped absorbent material and the walls of the conical section are lined with a layered absorbent material.

3. The anechoic test chamber of claim 1 wherein said chamber is portable having structural support means attached to said chamber with wheels for transporting said chamber.

4. The anechoic test chamber of claim 1 wherein said cylindrical section has a side access door arranged to provide convenient access to said antenna support structure.

5. The anechoic test chamber of claim 1 including pivot hinges connecting the transverse end wall of the cylindrical section and the cylindrical section, whereby said end wall is able to open on said pivot hinges for access to said chamber.

6. The anechoic test chamber of claim 1 including pivot hinges connecting the conical section and the cylindrical section whereby said conical section is pivotable with respect to said cylindrical section for access to said chamber.

7. The anechoic test chamber of claim 1 wherein said antenna support structure comprises a pedestal having means for remotely controlling movement of the pedestal.

\* \* \* \* \*